United States Patent
Rakita et al.

(10) Patent No.: US 9,721,155 B2
(45) Date of Patent: Aug. 1, 2017

(54) DETECTING DOCUMENT TYPE OF DOCUMENT

(71) Applicant: Microsoft Technology Licensing, LLC, Redmond, WA (US)

(72) Inventors: Marko Rakita, Novisad (RS); Andreja Ilic, Belgrade (RS); Dusan Lukic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 244 days.

(21) Appl. No.: 14/542,540

(22) Filed: Nov. 14, 2014

(65) Prior Publication Data

US 2016/0140088 A1  May 19, 2016

(51) Int. Cl.
G06F 17/00 (2006.01)
G06K 9/00 (2006.01)

(52) U.S. Cl.
CPC ..... *G06K 9/00442* (2013.01); *G06K 9/00463* (2013.01)

(58) Field of Classification Search
CPC .......... G06K 9/00442; G06K 9/00463
See application file for complete search history.

(56) References Cited

U.S. PATENT DOCUMENTS

| 5,848,184 | A  * | 12/1998 | Taylor | G06K 9/00463 382/173 |
| 7,392,473 | B2 * | 6/2008 | Meunier | G06K 9/00469 715/247 |
| 7,792,362 | B2 | 9/2010 | Berkner et al. | |
| 7,870,503 | B1 * | 1/2011 | Levy | G06F 9/4443 707/797 |
| 7,961,987 | B2 | 6/2011 | Goodwin et al. | |
| 8,023,738 | B1 | 9/2011 | Goodwin et al. | |
| 8,452,132 | B2 * | 5/2013 | Isaev | G06K 9/00469 382/173 |
| 8,782,516 | B1 | 7/2014 | Dozier | |
| 9,582,494 | B2 * | 2/2017 | Oro | G06F 17/2785 |
| 2006/0288015 | A1 * | 12/2006 | Schirripa | G06F 17/30905 |
| 2008/0301548 | A1 | 12/2008 | Sellers et al. | |
| 2010/0251104 | A1 | 9/2010 | Massand | |
| 2011/0173532 | A1 | 7/2011 | Forman et al. | |
| 2014/0208191 | A1 | 7/2014 | Zaric et al. | |

OTHER PUBLICATIONS

Malerba et al., "Machine Learning for Reading Order Detection in Document Image Understanding," Studies in Computational Intelligence (SCI) 90, pp. 45-69 (2008).*
Bailey, Lori, "What Is an Accessible PDF?", In Proceedings of Web Accessibility Center Workshop, Jan. 2005, 4 pages.
Panjwani, et al., "Script-Agnostic Reflow of Text in Document Images", In Proceedings of the 13th International Conference on Human Computer Interaction with Mobile Devices and Services, Aug. 30, 2011, 4 pages.

* cited by examiner

*Primary Examiner* — Amelia Tapp
(74) *Attorney, Agent, or Firm* — Turk IP Law, LLC

(57) ABSTRACT

Detection of a document type of a document is provided. An application such as a document processing application analyzes a document to detect features of the document and pages of the document, based on an action selecting the document. The features include declarative and separative features. A type of the pages is detected based on the features. The type of the pages and values of the features of the document are aggregated to identify the document type of the document.

15 Claims, 7 Drawing Sheets

400

402

404

Article. I.

Section. 1.

All legislative Powers herein granted shall be vested in a Congress of the United States, which shall consist of a Senate and House of Representatives.

Section. 2.

The House of Representatives shall be composed of Members chosen every second Year by the People of

408 the several States, and the Electors in each State shall have the Qualifications requisite for Electors of the most numerous Branch of the State Legislature.

No Person shall be a Representative who shall not have attained to the Age of twenty five Years, and been seven Years a Citizen of the United States, and who shall not, when elected, be an Inhabitant of that State in which he shall be chosen.

Representatives and direct Taxes shall be apportioned among the several States which may be

406 included within this Union, according to their respective Numbers, which shall be determined by adding to the whole Number of free Persons, including those bound to Service for a Term of Years, and excluding Indians not taxed, three fifths of all other Persons. The actual Enumeration shall be made within three Years after the first Meeting of the Congress of the United States, and within every subsequent Term of ten Years, in such Manner as they shall by Law direct. The Number of Representatives shall not exceed one for every thirty Thousand, but each State shall have at Least one

410

Representative; and until such enumeration shall be made, the State of New Hampshire shall be entitled to chuse three, Massachusetts eight, Rhode-Island and Providence Plantations one, Connecticut five, New-York six, New Jersey four, Pennsylvania eight, Delaware one, Maryland six, Virginia ten, North Carolina five, South Carolina five, and Georgia three.

When vacancies happen in the Representation from any State, the Executive Authority thereof shall issue Writs of Election to fill such Vacancies.

*FIG. 4*

DETECTING DOCUMENT TYPE OF DOCUMENT

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common Such devices execute a wide variety of applications ranging from communication applications to complicated analysis tools. Many such applications render documents through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to detecting a document type of a document. In some example embodiments, a document processing application may analyze a document to detect features of the document and pages of the document, based on an action selecting the document. A type of the pages may be detected based on the features. The type of the pages and values of the features of the document may be aggregated to identify a document type of the document.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 4 illustrates an example of a printing layout of a document to detect the document type, according to embodiments;

DETAILED DESCRIPTION

Figure 1:
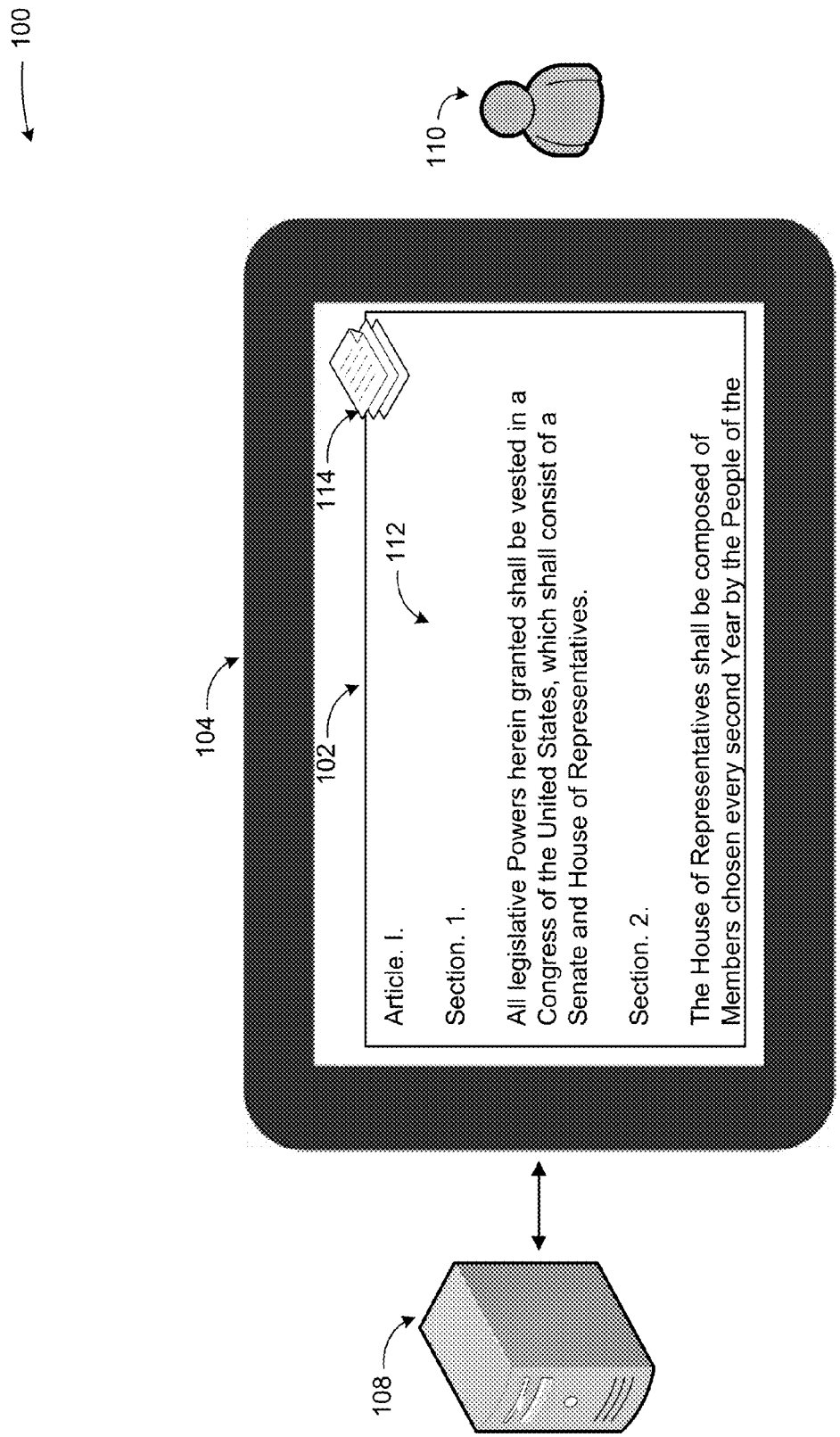
FIG. 1 is a conceptual diagram illustrating an example of detecting a document type of a document, according to embodiments.

As briefly described above, a document type of a document may be detected by a document processing application. A document may be analyzed to detect features of the document and pages of the document, based on an action selecting the document. The features may include declarative features that correspond to formatting properties of the pages and separative features that include reading order complexity, a graphics area and text coverage, a forms coverage, a printing layout, or a sidebar. A type of the pages may be detected based on the features. The type of the pages and values of the features of the document may be aggregated to identify a document type of the document that may include a text based document, a form based document, a spreadsheet document, a presentation document, and a combination of each, among others.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to detect a document type of a document. Examples of platforms include, but are not limited to, a hosted service. More detail on these technologies and example embodiments may be found in the following description.

FIG. 1 is a conceptual diagram illustrating an example of detecting a document type of a document, according to embodiments.

In a diagram 100, a computing device 104 may execute a document processing application 102. The computing device 104 may include a tablet device, a laptop computer, a desktop computer, and a smart phone, among others. The computing device 104 may display the document processing application 102 to a user 110. The user 110 may be allowed to interact with the document processing application 102 through an input device or touch enabled display component of the computing device 104. The computing device 104 may include a display device such as the touch enabled display component, and a monitor, among others to provide a user interface of the document processing application 102 to the user 110. The document processing application 102 may analyze the document 114 to detect features of the document and the page 112 of the document 114 based on an action selecting the document 114. The action may be an interaction of the user 110 with the document processing application 102 selecting the document 114. The user 110 may interact with the document processing application 102 with a keyboard based input, a mouse based input, a voice based input, a pen based input, and a gesture based input, among others. The gesture based input may include one or more touch based actions such as a touch action, a swipe action, and a combination of each, among others.

The document presentation application 102 may present a page 112 of a document 114. The document 114 may be retrieved from a local storage such a storage media, a memory, a hard disk drive, and a solid state drive, among others. The document 114 may also be retrieved from a remote storage such as a server 108 that hosts documents and provides services associated with documents. The page 112 of the document 114 may include a variety of components such as borders, and sidebars, among others. The page 112 may also include properties such as bounding boxes, text properties, font properties, shape properties, among others. Various embodiments may utilize many page components' properties such as bounding boxes, text and font properties (of textual elements), shape (of geometrical elements), and similar ones.

While the example system in FIG. 1 has been described with specific components including the computing device 104, the document processing application 102, the page 112, and the document 114, embodiments are not limited to these components or system configurations and can be implemented with other system configuration employing fewer or additional components.

Figure 2:
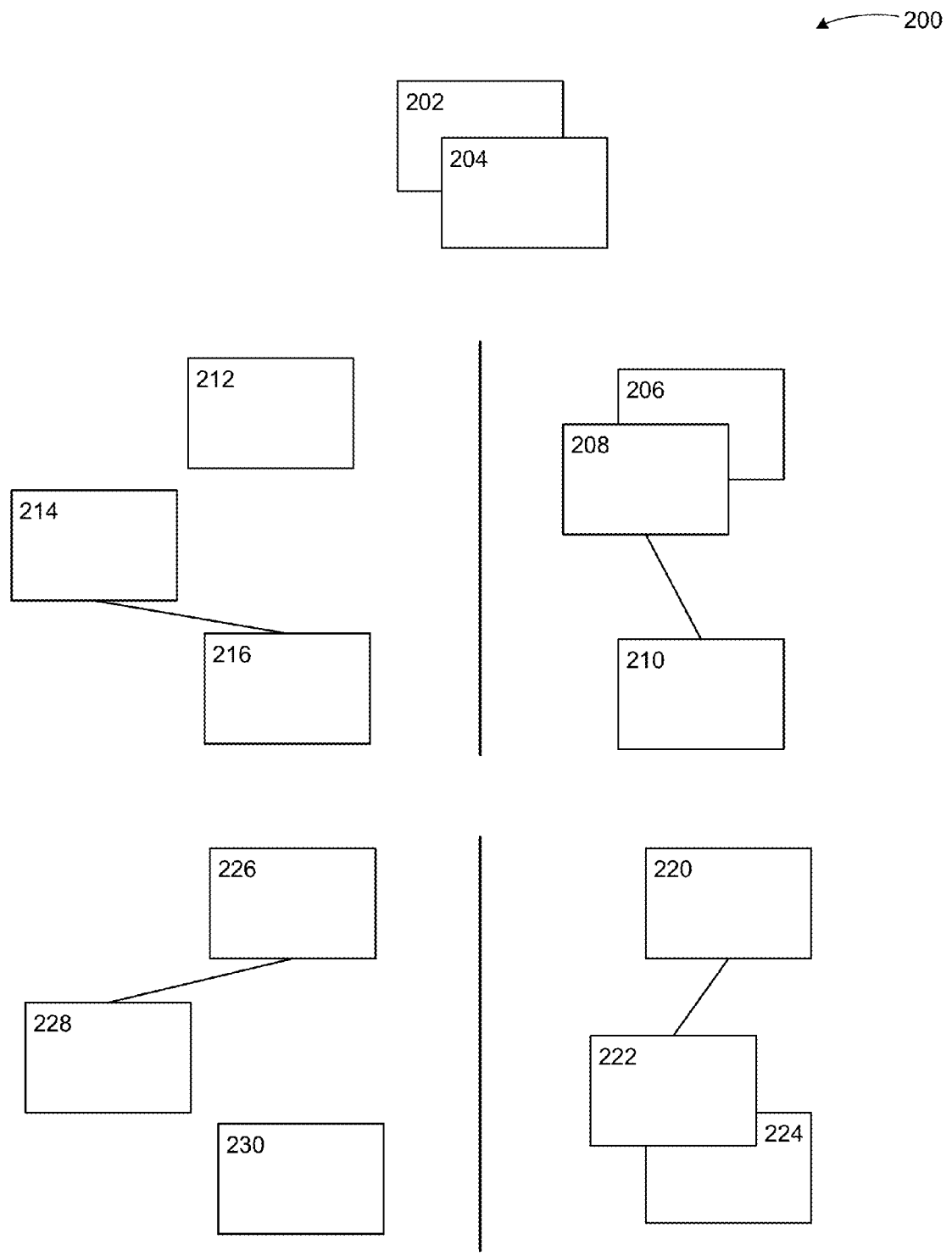
FIG. 2 illustrates an example of generating a reading order tree of components of a document to detect the document type, according to embodiments.

FIG. 2 illustrates an example of generating a reading order tree of components of a document to detect the document type, according to embodiments.

In a diagram 200, a value of a separative feature of pages of a document may be computed by a document processing application. The separative features of the pages may include a reading order complexity, a graphics area and text coverage, a forms coverage, a printing layout, and a sidebar.

A reading order tree may be generated to compute a value for the reading order complexity. Components of a page of the document may be inserted into a reading order tree as elements to generate the reading order tree. The reading order tree may be organized based on an analysis of the elements. Two elements may be detected to be connected if they overlap such as element 202 that overlaps with an element 204. Following element pairs are connected in a computation according to embodiments: elements 202 and 204, elements 214 and 216, elements 208 and 210, elements 208 and 206, elements 228 and 226, elements 220 and 222, elements 222 and 224.

Thus, to generate the reading order, elements are connected. One example case may be when elements are intersecting, like elements 202 and 204. Another example case may be when elements have horizontal overlap, like elements 212 and 216, and elements 206 and 210. However, an exception from this case is when elements that have horizontal overlap, also have another element between them that is already connected to at least one of those two elements. Elements, which are not connected include elements 212 and 214, elements 212 and 216, elements 206 and 210, elements 228 and 230, elements 226 and 230, elements 220 and 224.

Depending on how many chunks of text page has, it may be more likely to belong to certain groups of documents. For example, if there is only one big chunk of text page is likely to belong to a book or business document. Alternatively, the page may be more likely to belong to a newspaper, if there are many chunks of text on it. A document type detection system according to embodiments may leverage this attribute of text containing documents and consider not only properties of individual text chunks and their number but their relationships as well.

For example, a page having many text chunks may be considered, first of which may be very large positioned at the top of the page, followed by a list of names which may be partitioned into several columns, followed by another big text chunk spanning whole page width, followed by another list of names broken into columns, and so on. A classifier, which only considers number of text chunks, may classify such page as page of a newspapers, even though it may be clear to any reader, even the one who does not understand the language page is written in, that the page may be more likely to belong to a book or business document than to a newspapers.

Figure 3:
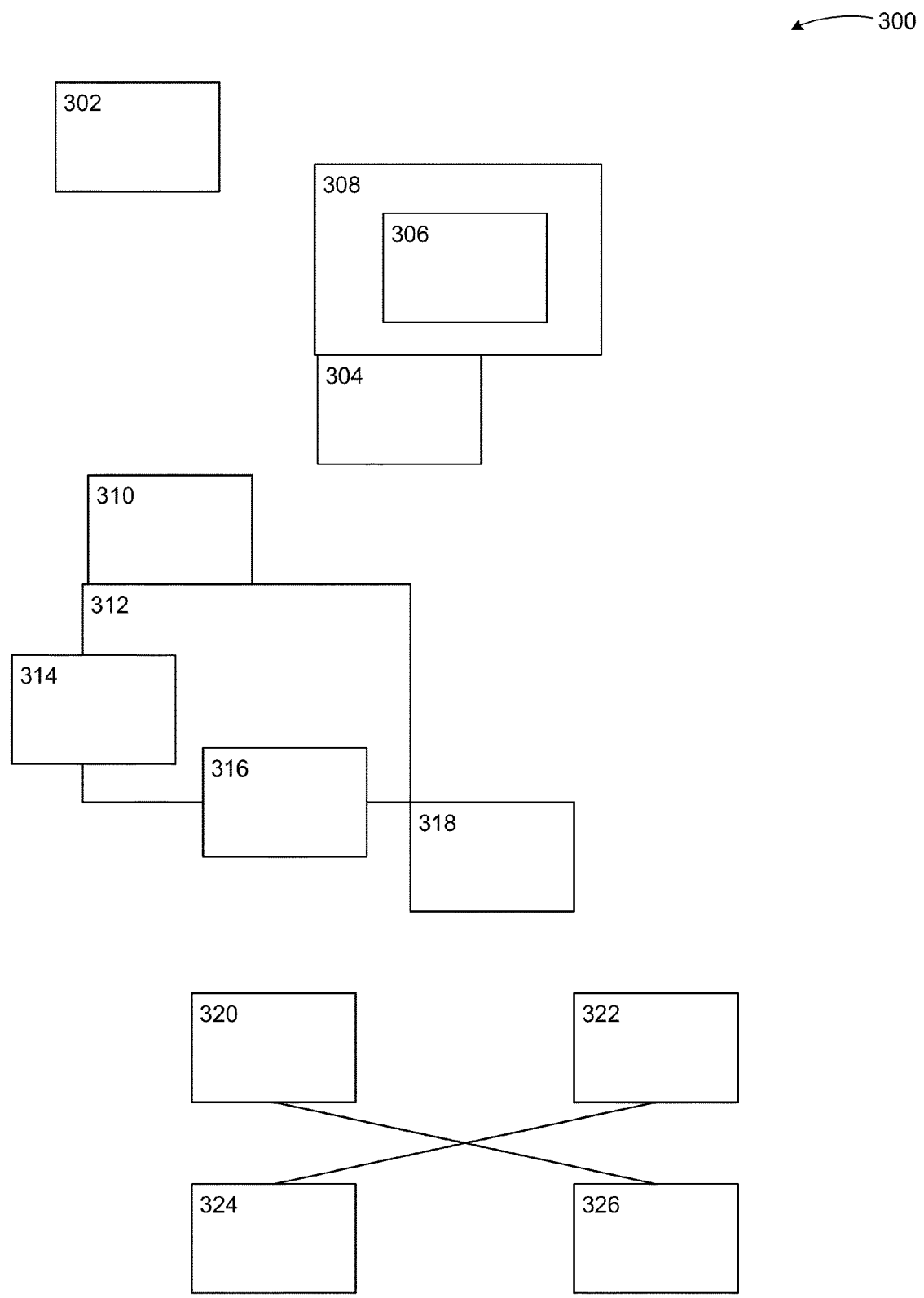
FIG. 3 illustrates an example of processing components of a document through the reading order tree to detect the document type, according to embodiments.

FIG. 3 illustrates an example of processing components of a document through the reading order tree to detect the document type, according to embodiments.

In a diagram 300, a value of the reading order complexity may be computed using a reading order tree generated from components of pages of the document. The components may be inserted as elements into the reading order tree. An element 302 and an element 304 are not connected. Connection between elements is not transitive relation. Thus, if A is connected with B and B is connected to C it does not mean that A is connected to C. Elements 302 and 304 illustrate an example case where elements do not have horizontal overlap. The exception from this case is when there is another element (i.e., element 306) between them, which has horizontal overlap with lower element and is in an area restricted by an axis going through lower element's top border, an axis going through the lower element's left border, and an axis going through the upper element's bottom border. Elements 302 and 304 are not connected for another reason. They are not connected because there is element like 306 who is in the area within bounding box 308.

The bounding box 308 may be considered like a forbidden area in space between elements 302 and 304. Elements 302 and 304 may have been connected if it was not for the presence of the element 306 in the area. Elements 310 and 318 are not considered as connected because of elements like 314 and 316, which are in the area encompassed by the bounding box 312. If elements 314 and 316 were not in the area, elements 310 and 318 may have been considered as connected.

Furthermore, a cross connection between an element 320 and an element 326 and a cross connection between an element 322 and an element 324 may be discarded while generating the reading order tree. The cross connection may be discarded as connections in the reading order tree because the element 320 and the element 322 have a vertical overlap, the element 324 and the element 326 have a vertical overlap, the element 320 and the element 324 have a horizontal overlap, and the element 322 and the element 326 have a horizontal overlap. The overlap conditions need all to be true for the cross-connection to be discarded according to an approach in some embodiments. A value for the reading order complexity may be computed in response to creating the reading order tree. The value may be computed using the following formula:

Value=Number of roots of the reading order tree+
sum (incoming connections for each
element*outgoing connection for each element).

Furthermore, a graphics area and text coverage may be identified as a separative feature of the pages. A value of the graphics area and text coverage may be computed with the following formula:

Value=Sum (for each graphic (a graphic
area*number of characters that cover the
graphic area^2)).

Additionally, a forms coverage may be identified as a separative feature of the page. Components of the page that include a horizontal line replaceable by text may be considered as a form. Example of the horizontal line may include a geometric shape that mimics a horizontal line, a number of adjunct '.' characters, or a number of '_' characters in a page. A subset of the components that intersect other lines may be discarded. A subset of the components that lack adjacent text may be discarded. A subset identified as part of a table of contents may also be discarded. A subset of horizontal lines which may be part of a high-level layout element other than a form may also be discarded. A value of the forms coverage may be computed with the following formula:

Value=Sum (a form length for each form)*(a number
of forms)^2.

FIG. 4 illustrates an example of a printing layout of a document to detect the document type, according to embodiments.

In a diagram 400, a document processing application may process a page 402 of a document that may be presented in a printing layout. The document may include components 404, 406, 408, and 410 that may be placed in a fixed format to provide a content of the document in a print ready format. The printing layout may be identified as a separative feature of the page 402. The printing layout may be detected by locating borders for each of the pages of the document. A subset of the borders that intersect with a text on each one of the pages may be discarded. In response to detecting the borders as vertically and horizontally aligned, a value of 1 may be assigned to the printing layout for the page 402. In response to a failure to detect the borders as vertically aligned, a value of 0 may be assigned to the printing layout for the page 402.

A sidebar may also be identified as a separative feature of the pages. Alternatively, in response to detecting the pages that lack an outlined sidebar, a layout analysis may be performed on the pages to detect the sidebar. The layout analysis may also be performed on the pages to adjust a confidence score associated with detecting the sidebar. A value may be assigned to the sidebar in response to locating the sidebar on a subset of the pages. The value may depend on a confidence score associated with identifying the sidebar. The confidence score may be assigned based on attributes of the sidebar such as borders that increase the confidence score or a lack of borders that decrease the confidence score. In some examples, a document may not have notion of many of the "separative" features depending on its format. For example, some document formats may not have notion of a sidebar. For such document formats, layout analysis algorithms may be applied to detect the presence of the sidebar. This approach may also be used to adjust confidence of such a feature.

Furthermore, declarative features may also be identified as a subset of features of the pages. The declarative features may correspond to formatting properties associated with the pages. The declarative features may be identified from a number of images in each of the pages, an area overlaid by the images in each of the pages, an overlay by text in each of the pages, a number of lines of the text in each of the pages, and an orientation of each of the pages, among others.

Upon computing values for the features for each page of the document, the features and the values may be processed through a classifier such as a decision tree, artificial neural networks, and support vector machines, among others to detect type of the pages. The classifier may be prepared with a set of pages that are labeled with the type of the pages. A classier such as the decision tree may be trained by a machine learning technique.

A type of a page assigned to a majority subset of the pages may be assigned to the document type. The document type may include a text based document, a form, a spreadsheet document, a presentation documentation, and a combination of each, among others. The majority subset may be identified as a highest number of pages that share a type. Alternatively, the type of the pages may be detected to vary. A dominant document type associated with one of the two pages may be assigned as the document type. The dominant document type may include a form.

Alternatively, parts of the document such as sections, and chapters, among others may be analyzed instead of pages to detect the document type. Features of the document may be analyzed based on the parts of the document. The features of the document may include a table of content. The table of content may be used to classify the document as a book or a scientific paper. The features of the document may also include tables and columns or similar structures. The document with tables and columns based structures may be classified based on suitability for reflow. The document with columns may adjust content when reflowing. The document with tables may not adjust content when reflowing. The features of the document may be used to compute the document type such as a book or a scientific paper based on the table of content or the document that may be suitable for reflow based on presence or lack of columns or tables. A classifier may be used to compute the document type. The classifier may analyze the features of the document to detect the document type.

The technical advantage of detecting a document type of a document may include improved usability of user interfaces that present a classification of documents compared to legacy document categorization solutions.

The example scenarios and schemas in FIG. 1 through 4 are shown with specific components, data types, and configurations. Embodiments are not limited to systems according to these example configurations. Detecting a document type a document may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
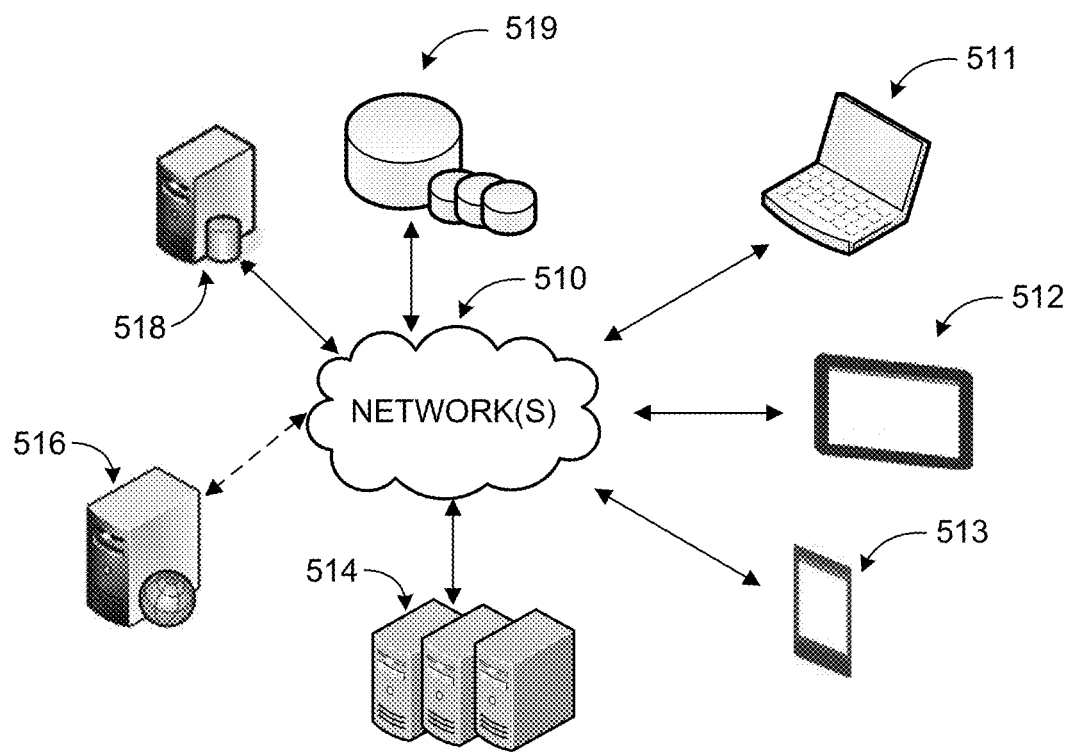
FIG. 5 is a simplified networked environment, where a system according to embodiments may be implemented.

FIG. 5 is an example networked environment, where embodiments may be implemented. A document processing application configured to detect a document type of a document may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A document processing application may analyze a document to detect features of the document and pages of the document, based on an action selecting the document. A type of the pages may be detected based on the features. The type of the pages and values of the features of the document may be aggregated to identify the document type of the document. The document processing application may store data associated with the document in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to detect a document type a document. Furthermore, the networked environments discussed in FIG. 5 are for illustration purposes only. Embodiments are not limited to the example applications, modules, or processes.

Figure 6:
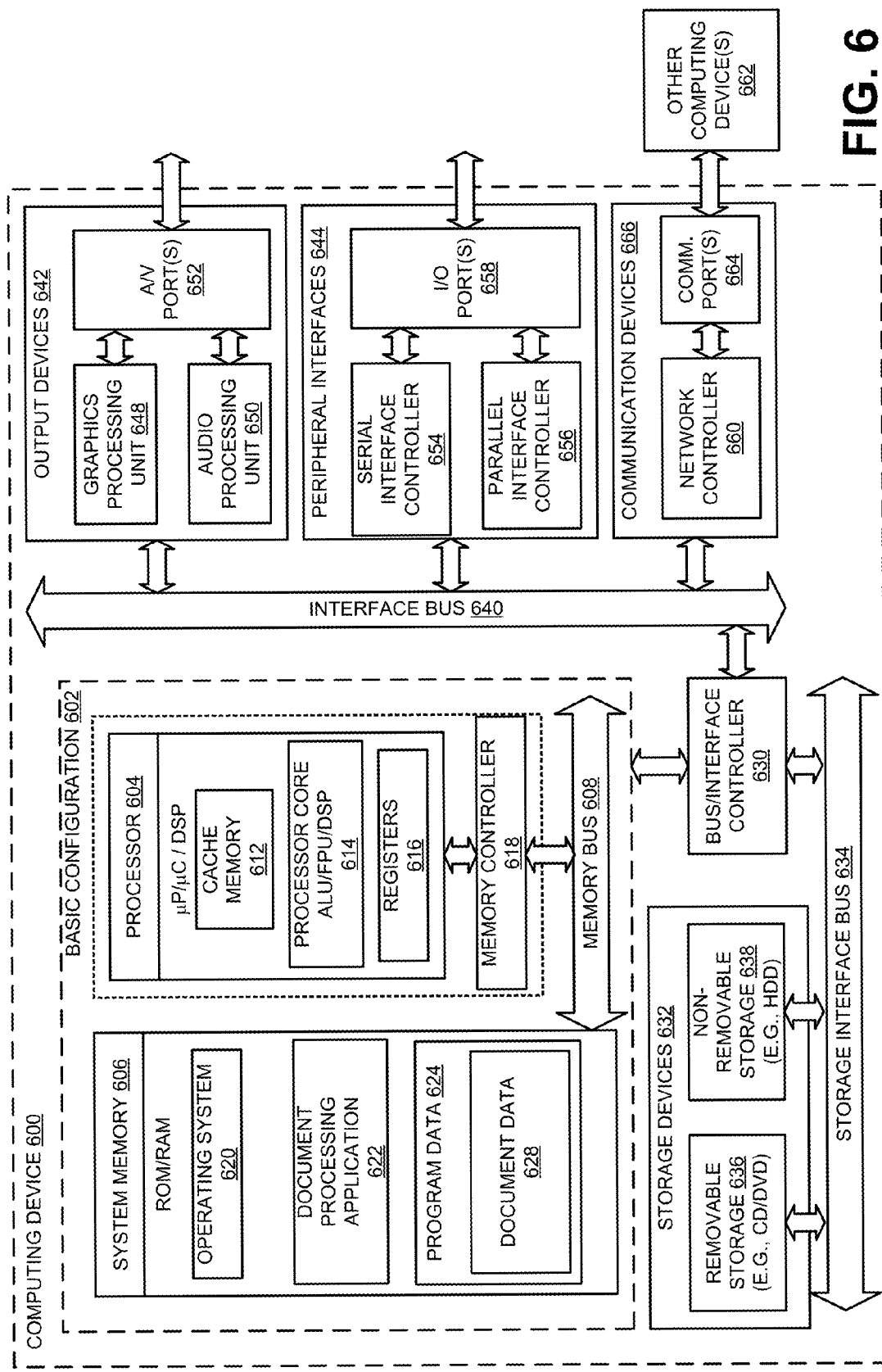
FIG. 6 illustrates a general purpose computing device, which may be configured to detect a document type of a document.

FIG. 6 illustrates a general purpose computing device, which may be configured to detect a document type of a document, arranged in accordance with at least some embodiments described herein.

For example, the computing device 600 may be used to detect a document type of a document. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a document processing application 622, and a program data 624. The document processing application 622 may analyze the document to detect features of the document and pages of the document, based on an action selecting the document. A type of the pages may be detected based on the features. The type of the pages and values of features of the document may be aggregated to identify the document type of the document. Components of the document processing application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the document processing application 622, displayed by the touch based device. The program data 624 may also include, among other data, a document data 628, or the like, as described herein. The document data 628 may include separative features and declarative features, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to detect a document type of a document. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
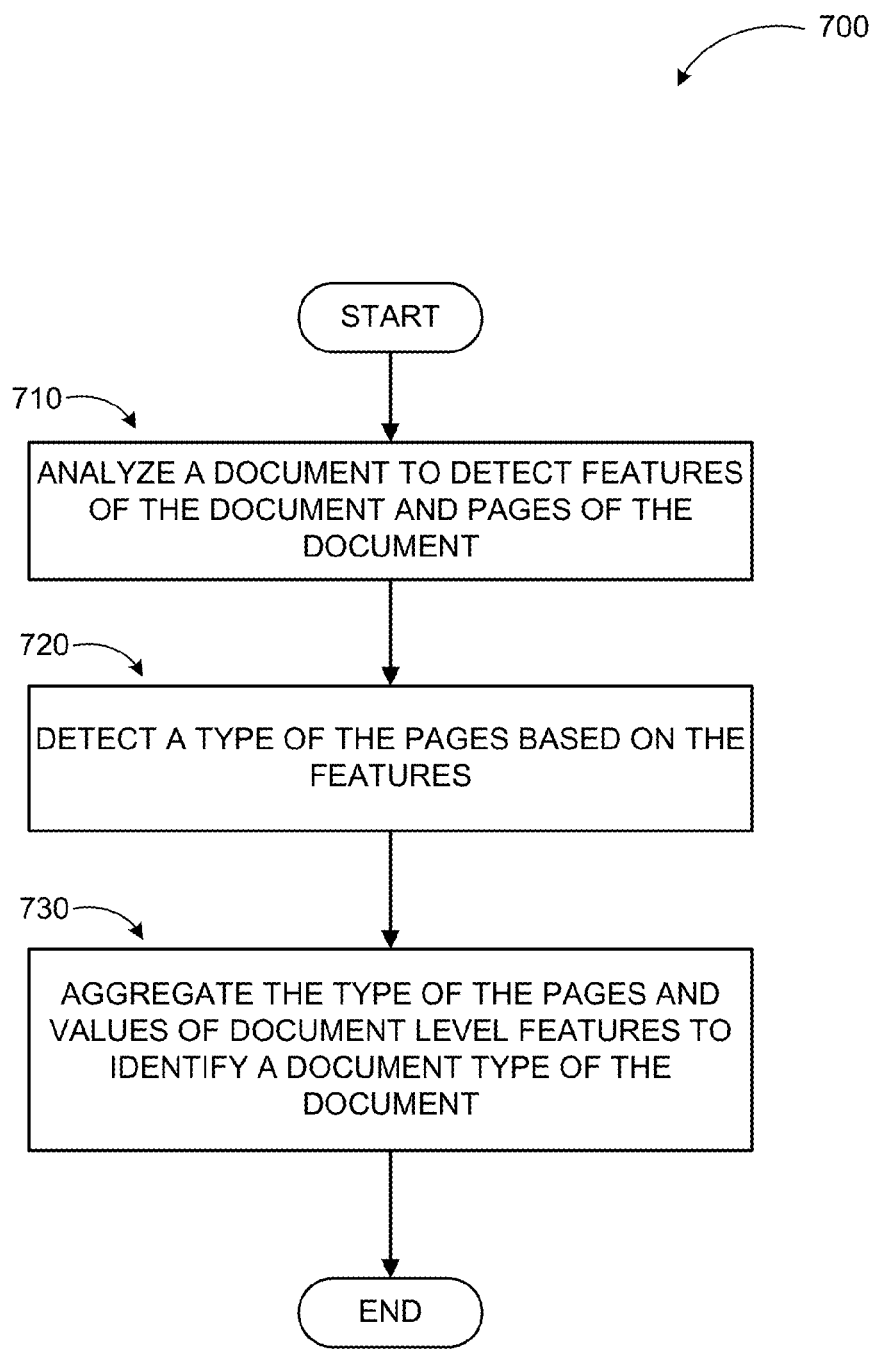
FIG. 7 illustrates a logic flow diagram for a process to detect a document type of a document, according to embodiments.

FIG. 7 illustrates a logic flow diagram for a process to detect a document type of a document, according to embodiments. Process 700 may be implemented on a document processing application.

Process 700 begins with operation 710, where a document may be analyzed to detect features of the document and pages of the document, based on an action selecting the document. The features may include declarative features that correspond to formatting properties of the pages and separative features that include reading order complexity, a graphics area and text coverage, a forms coverage, a printing layout, or a sidebar. At operation 720, a type of the pages may be detected based on the features. The type may include a text based page, a spreadsheet, a presentation page, a form, or a combination of each, among others. The type of the pages and values of the features of the document may be aggregated to identify the document type of the document, at operation 730.

The operations included in process 700 are for illustration purposes. A document processing application according to embodiments may be implemented by similar processes with fewer or additional steps, as well as in different order of operations using the principles described herein.

According to some examples, a method that is executed on a computing device to detect a document type of a document may be described. The method may include analyzing the document to detect features of the document and pages of the document, detecting a type of the pages based on the features, and aggregating the type of the pages and values of features of the document to identify the document type of the document.

According to other examples, the method may further include detecting declarative features as a subset of the features, where the declarative features correspond to formatting properties of the pages and identifying the declarative features from one or more from a set of: a number of images in each of the pages, an area overlaid by the images in each of the pages, an overlaid by text in each of the pages, a number of lines of the text in each of the pages, and an orientation of each of the pages. The method may further include detecting separative features as a subset of the features, identifying one of the separative features as a reading order complexity associated with the pages, generating a reading order tree for each of the pages to compute a value for the reading order complexity, and computing the value for the reading order complexity by adding a number of roots in the reading order tree with a sum of incoming connections for each element of the reading order tree multiplied by outgoing connections for each element.

According to further examples, the method may further include identifying one of the separative features as a graphics area and text coverage and computing a value for the graphics area and text coverage with a sum of a graphic area multiplied by a square of a number of characters that cover the graphic area for each of the graphics. One of the separative features may be identified as a forms coverage and a value for the forms coverage may be computed with a sum of a form length for each form multiplied by a square of a number of forms. The method may further include identifying one of the separative features as a printing layout, detecting the printing layout by locating borders for each of the pages, discarding a subset of the borders that intersect with a text on each of the pages, in response to detecting the borders as vertically aligned, assigning a value of 1 to the printing layout, and in response to a failure to detect the borders as vertically aligned, assigning a value of 0 to the printing layout. The method may further include identifying one of the separative features as a sidebar and assigning a value to the sidebar in response to locating the sidebar on a subset of the pages, where the value is dependent on a confidence score associated with identifying the sidebar.

According to some examples, a computing device to detect a document type of a document may be described. The computing device may include a display device, a memory, a processor coupled to the memory and the display device. The processor may be configured to analyze the document to detect features of the document and pages of the document, based on an action selecting the document, where the features include declarative features that correspond to formatting properties of the pages and separative features that include one or more from a set of: reading order complexity, a graphics area and text coverage, a forms coverage, a printing layout, and a sidebar, detect a type of the pages based on the features, aggregate the type of the pages and values of the features of the document to identify the document type of the document, and present the document type on the display device.

According to other examples, the document processing application is further configured to compute the values for the features, process the features and the values through a classifier to detect the type of the pages, where the classifier includes one or more of: a decision tree, artificial neural networks, support vector machines, and comparable machine learning techniques prepare the classifier tree with a labeled document that has pages that are labeled with the type of the pages. The features of the document may be analyzed based on parts of the document to identify the document type, where the parts include one or more of a section, and a chapter. In response to detecting the features of the document to include a table of content, the document type may be identified as one from a set of: a book and a scientific paper. The document processing application is further configured to detect the type of the pages to vary and assign a dominant document type associated with one of the two pages as the document type, where the dominant document type may include a form type, a paper document type, a presentation document type, and a magazine type, among others.

According to some examples, a computer-readable memory device with instructions stored thereon to detect a document type of a document may be described. The instructions may include actions that are similar to the method described above.

According to some examples, a means to detect a document type of a document may be described. The means to detect the document type may include a means for analyzing the document to detect features of the document and pages of the document, based on an action selecting the document, a means for detecting a type of the pages based on the features, and a means for aggregating the type of the pages and values of the features of the document to identify the document type of the document.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to detect a document type of a document, the method comprising:
    analyzing the document to detect features of the document and pages of the document based on an action selecting the document;
    detecting separative features as a subset of the features;
    identifying one of the separative features as a reading order complexity associated with the pages;
    generating a reading order tree for each of the pages to compute a value for the reading order complexity;
    computing the value for the reading order complexity by adding a number of roots in the reading order tree with a sum of incoming connections for each element of the reading order tree multiplied by outgoing connections for each element;
    detecting a type of the pages based on the features; and
    aggregating the type of the pages and values of the features of the document to identify the document type of the document.

2. The method of claim 1, further comprising:
    detecting declarative features as a subset of the features, wherein the declarative features correspond to formatting properties of the pages.

3. The method of claim 2, further comprising:
    identifying the declarative features from one or more from a set of: a number of images in each of the pages, an area overlaid by the images in each of the pages, an area overlaid by text in each of the pages, a number of lines of the text in each of the pages, and an orientation of each of the pages.

4. The method of claim 1, further comprising:
    identifying one of the separative features as a graphics area and text coverage; and
    computing a value for the graphics area and text coverage with a sum of a graphic area multiplied by a square of a number of characters that cover the graphic area for each of the graphics.

5. The method of claim 1, further comprising:
    identifying one of the separative features as a forms coverage; and
    computing a value for the forms coverage with a sum of a form length for each form multiplied by a square of a number of forms.

6. The method of claim 1, further comprising:
    identifying one of the separative features as a printing layout;
    detecting the printing layout by locating borders for each of the pages;
    discarding a subset of the borders that intersect with a text on each of the pages;
    in response to detecting the borders as vertically aligned, assigning a value of 1 to the printing layout; and
    in response to a failure to detect the borders as vertically aligned, assigning a value of 0 to the printing layout.

7. The method of claim 1, further comprising:
    identifying one of the separative features as a sidebar; and
    assigning a value to the sidebar in response to locating the sidebar on a subset of the pages, wherein the value is dependent on a confidence score associated with identifying the sidebar.

8. A computing device to detect a document type of a document, the computing device comprising:
    a display device;
    a memory;
    a processor coupled to the memory and the display device, the processor executing a document processing application in conjunction with instructions stored in the memory, wherein the document processing application is configured to:
        analyze the document to detect features of the document and pages of the document, based on an action selecting the document, wherein the features include declarative features that correspond to formatting properties of the pages and separative features that include a reading order complexity associated with the pages and one or more from a set of: a graphics area and text coverage, a forms coverage, a printing layout, and a sidebar;

generate a reading order tree for each of the pages to compute a value for the reading order complexity;

compute the value for the reading order complexity by adding a number of roots in the reading order tree with a sum of incoming connections for each element of the reading order tree multiplied by outgoing connections for each element;

detect a type of the pages based on the features;

aggregate the type of the pages and values of the features of the document to identify the document type of the document; and present the document type, on the display device.

9. The computing device of claim 8, wherein the document processing application is further configured to:

compute the values for the features; and process the features and the values through a classifier to detect the type of the pages, wherein the classifier includes one or more of: a decision tree, artificial neural networks, and support vector machines.

10. The computing device of claim 9, wherein the document processing application is further configured to:

prepare the classifier with a labeled document that has pages that are labeled with the type of the pages.

11. The computing device of claim 8, wherein the document processing application is further configured to:

analyze the features of the document based on parts of the document to identify the document type, wherein the parts include one or more of a section, and a chapter.

12. The computing device of claim 11, wherein the document processing application is further configured to:

in response to detecting the features of the document to include a table of content, identify the document type as one from a set of: a book and a scientific paper.

13. The computing device of claim 8, wherein the document processing application is further configured to:

detect the type of the pages to vary; and assign a dominant document type associated with one of the pages as the document type, wherein the dominant document type includes a form type, a paper document type, a presentation document type, and a magazine type.

14. A computer-readable memory device with instructions stored thereon to detect a document type of a document, the instructions comprising:

analyzing the document to detect features of the document and pages of the document, based on an action selecting the document, wherein the features include declarative features that correspond to formatting properties of the pages and separative features that include a reading order complexity associated with the pages and one or more from a set of: a graphics area and text coverage, a forms coverage, a printing layout, and a sidebar;

generating a reading order tree for each of the pages to compute a value for the reading order complexity;

computing the value for the reading order complexity by adding a number of roots in the reading order tree with a sum of incoming connections for each element of the reading order tree multiplied by outgoing connections for each element;

detecting a type of the pages based on the features; and aggregating the type of the pages and values of the features of the document to identify the document type of the document.

15. The computer-readable memory device of claim 14, wherein the instructions further comprise:

computing values for the features;

processing the features and the values through a classifier to detect the type of the pages, wherein the classifier includes one or more of: a decision tree, artificial neural networks, and support vector machines; and preparing the classifier with a labeled document that has pages that are labeled with the type of the pages.

* * * * *